June 22, 1926. 1,589,693
H. J. HOF
APPARATUS FOR THE PRODUCTION OF YOGHURT AND SIMILAR BACTERIAL CULTURES
Filed Jan. 29, 1925
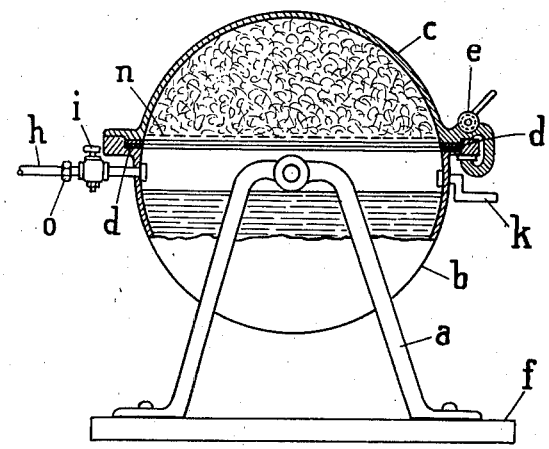
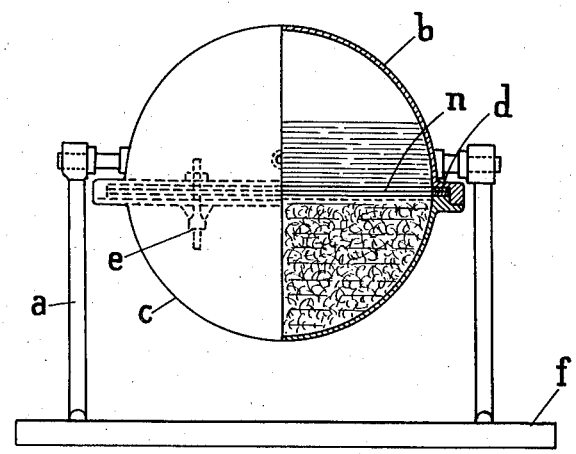
Inventor:
Herbert Jakob Hof Patented June 22, 1926.

1,589,693

UNITED STATES PATENT OFFICE.

HERBERT JAKOB HOF, OF ASCHAFFENBURG, GERMANY, ASSIGNOR OF ONE-HALF TO JEAN SEIPEL, OF KANSAS CITY, MISSOURI.

APPARATUS FOR THE PRODUCTION OF YOGHURT AND SIMILAR BACTERIAL CULTURES.

Application filed January 29, 1925. Serial No. 5,592.

It has already been proposed to use for the production of yoghurt and similar bacterial substances a vessel which is rotatable around the horizontal axis and divided by a partition into an upper and lower compartment. The upper compartment is designed for bran and the lower compartment for vaccinated milk. With the lower compartment an air conduit is connected so that a vacuum can be produced in the milk compartment, whereupon the vessel is rotated 180°. Air is now admitted into the upper compartment so that the milk is forced into the lower compartment to admix with the bran.

This invention has for its object to improve apparatus of this kind in such a manner that it is no longer necessary to enclose the vessel in a wooden box for heating the milk, as the wall of the vessel is reinforced and a very high steam pressure is made to act upon the bran so that the inner structure of the bran is torn and the bran becomes so porous that it more readily absorbs the milk vaccinated with bacteria.

The improved apparatus is shown by way of example on the accompanying drawing, in Fig. 1 in side elevation, partly in section and in Fig. 2 in front elevation partly in section, the vessel being rotated 180° with regard to the position shown in Fig. 1.

The apparatus consists of a lower cup-shaped vessel $b$ rotatably mounted on brackets $a$ and of an upper hood $c$ closed at the open lower end by a wire gauze $n$. The hood $c$ is removably mounted in the vessel $b$ by means of a clamping mechanism $e$, a packing $d$ being inserted between the two elements.

The brackets $a$ are fixed on a base plate $f$.

A vacuum pipe $h$ having a cock $i$ is connected with the vessel $b$. A pipe $k$ for supplying steam under pressure is connected with vessel $b$ at the side opposite the vacuum pipe $h$.

Into the cup-shaped vessel $b$ about 30 liters of condensed milk and some pure culture of yoghurt bacteria are poured. The hood $c$ is filled with bran and through the pipe $k$ high pressure steam is injected into the hood so that the inner structure of the bran is torn. After the cock $i$ has been opened a vacuum is produced in the vessel whereupon the cock $i$ is closed, the vacuum pipe $h$ screwed off at nut $o$ and the apparatus rotated 180°. The cock $i$ is opened again. The milk drops now through the wire gauze $n$ onto the bran, the inflowing air exerting a pressure upon the milk. When the bran has absorbed a sufficient quantity of milk it is removed from the apparatus and dried at low temperature. The product may be ground to powder or compressed to form tablets.

I claim:—

An apparatus for the production of yoghurt and similar bacterial cultures comprising in combination a cup-shaped vessel for the milk vaccinated with yoghurt bacteria, a hood filled with bran mounted on said cup-shaped vessel, a wire gauze closing the lower end of said hood, means for securely fixing said hood on said vessel, a vacuum pipe removably connected with said cup-shaped vessel, a steam pipe connected with said cup-shaped vessel for submitting the bran in the hood to the action of high pressure steam, and means for rotating said vessel 180° to pour the milk onto the bran.

In testimony whereof I affix my signature.

HERBERT JAKOB HOF.